US006421092B1

(12) United States Patent
Yui

(10) Patent No.: US 6,421,092 B1
(45) Date of Patent: Jul. 16, 2002

(54) AUTOMATIC PICTURE DISPLAY POSITION ADJUSTING CIRCUIT AND PICTURE DISPLAY APPARATUS USING THE SAME

(75) Inventor: Hirokatsu Yui, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/369,000

(22) Filed: Aug. 5, 1999

(30) Foreign Application Priority Data

Aug. 5, 1998 (JP) .......................................... 10-221384

(51) Int. Cl.[7] ............................. H04N 5/04; H04N 9/44
(52) U.S. Cl. ........................ 348/511; 345/699; 345/698
(58) Field of Search ................................ 348/511, 569, 348/570, 554, 555, 558, 552, 580; 345/114, 113, 11, 699, 698; H04N 5/04, 9/44

(56) References Cited

U.S. PATENT DOCUMENTS

| | | | | | |
|---|---|---|---|---|---|
| 5,623,316 | A | * | 4/1997 | Naito et al. | 348/569 |
| 5,713,040 | A | * | 1/1998 | Lee | 345/213 |
| 5,801,767 | A | * | 9/1998 | Wu | 348/511 |
| 5,870,073 | A | * | 2/1999 | Kitou et al. | 345/698 |
| 6,078,317 | A | * | 6/2000 | Sawada | 345/204 |

FOREIGN PATENT DOCUMENTS

| | | |
|---|---|---|
| EP | 707305 | 4/1996 |
| EP | 730372 | 9/1996 |
| EP | 851401 | 7/1998 |
| EP | 854466 | 7/1998 |

OTHER PUBLICATIONS

IBM Technical Disclosure Bulletin, "Automated Video Frequency/Mode Detection And Adjustment", vol. 38, No. 3, Mar. 1, 1995, pp. 45–47, XP000507972.
European Search Report, application No. EP 99115412, dated Oct.21, 1999.

* cited by examiner

*Primary Examiner*—Michael H. Lee
(74) *Attorney, Agent, or Firm*—Ratner & Prestia

(57) ABSTRACT

A picture display position adjusting circuit and a display device incorporating a microcomputer detects sync timing variation therein, calculates a value to be set in a pixel quantity converter according to the detected sync timing, reads a display position of a video signal to be displayed on a picture display device from the pixel quantity converter, recalculates the display position of the video signal according to the above read out display position data, and re-sets the corrected display position data in the pixel quantity converter. In this manner, manual picture adjustment when sync signal timing changes is avoided and a picture to just fit the effective picture display area of a picture display device can be automatically displayed.

7 Claims, 4 Drawing Sheets

AUTOMATIC PICTURE DISPLAY POSITION ADJUSTING CIRCUIT AND PICTURE DISPLAY APPARATUS USING THE SAME

FIELD OF THE INVENTION

The present invention relates to an automatic picture display position adjusting circuit which, in response to the various input signals with different timings of synchronizing signals, automatically adjusts positions and sizes of pictures to the effective picture display area of a pixel display device including a liquid crystal display device consisting of a great number of pixels, and a picture display apparatus using the automatic picture display position adjusting circuit and the pixel display device mentioned above.

BACKGROUND OF THE INVENTION

Along with the development of computers, signals input in a display apparatus have become increasingly diversified. In order to deal with such a variety of signals, a multiscan-type display has now become mainstream. However, as it is disclosed in Japanese Patent Laid Open 10-198309, even with the multiscan type display, it is difficult to correctly judge all of the various signals and precisely display pictures on the effective picture display area of the pixel display device. As a result, pictures may become excessively small or large or deviate in position, making a user adjust the picture to the optimum position and size watching at the displayed picture.

SUMMARY OF THE INVENTION

A display device which can display various signals output from the computer without the help of user's conscious effort and manual adjustment of size and positions of the pictures to be displayed, is desirable.

An automatic picture display position adjusting circuit and a display device of the present invention comprises:

A number of pixels converter for converting the number of video signals;

a sync signal separator for separating horizontal and vertical sync signals from the video signal;

A sync timing detector for detecting changes in the number of sync pulses of at least either of the horizontal or vertical signals output from the sync signal separator;

and a calculating/controlling means which, when the sync signal detected by the sync timing detector changes, calculates the value to be set in the number of pixels converter based on the detected changes in sync timing, calculates the display position of video signals being output from the number of pixels converter by reading it, and outputs corrected display position obtained through the recalculation for a right display position of the video signals to the number of pixels converter.

Above described configuration achieves an automatic display of the video signals in the full effective picture display area of a pixel display device without the help of any manual control of a user.

DESCRIPTION OF THE PREFERRED EMBODIMENTS

First Exemplary Embodiment

An automatic picture display position adjusting circuit in accordance with a first exemplary embodiment of the present invention is explained below, referring to FIGS. 1 and 2.

Figure 1:
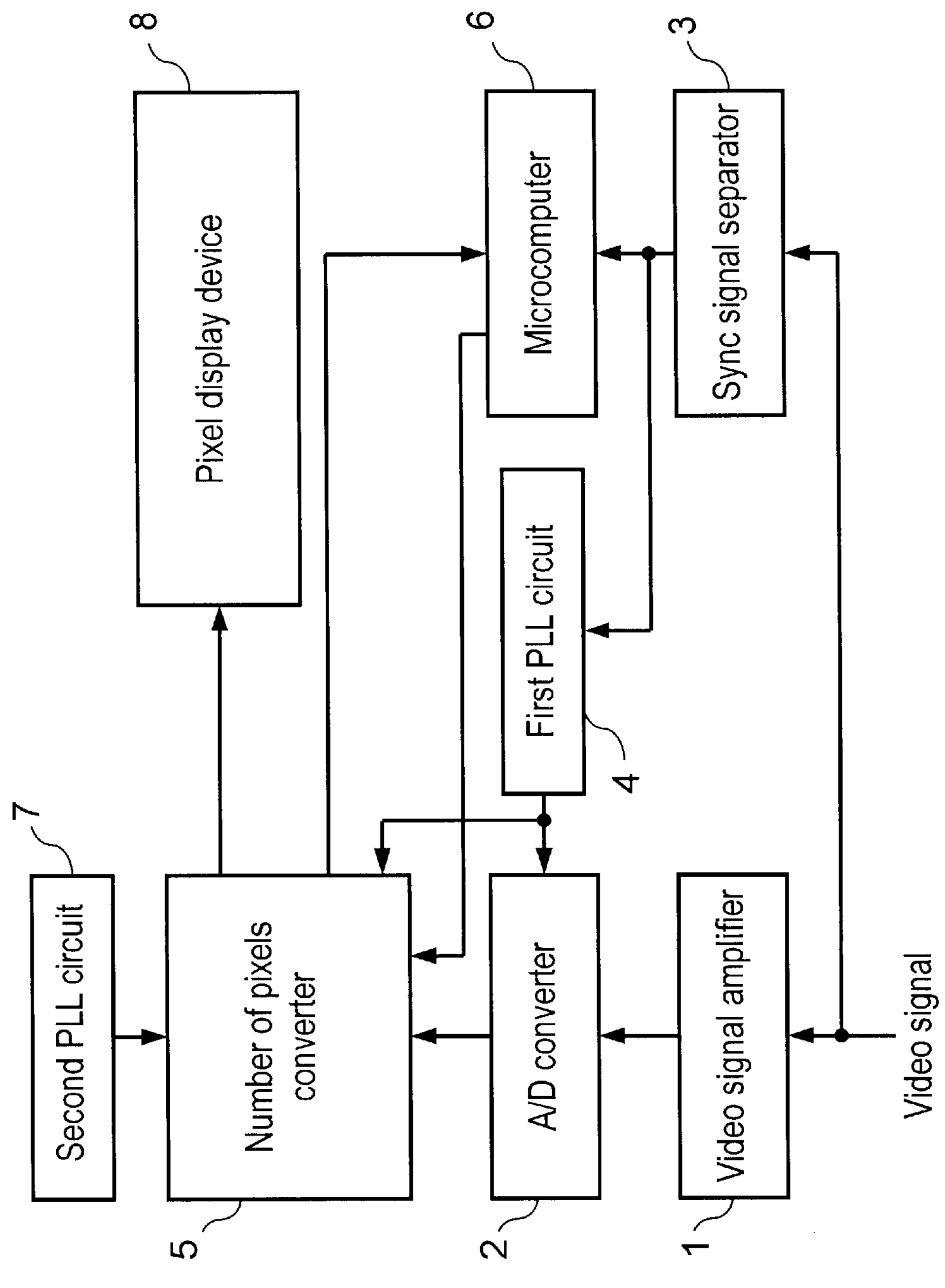
FIG. 1 shows a block diagram of an automatic picture display position adjusting circuit in accordance with a first exemplary embodiment of the present invention.
Figure 2:
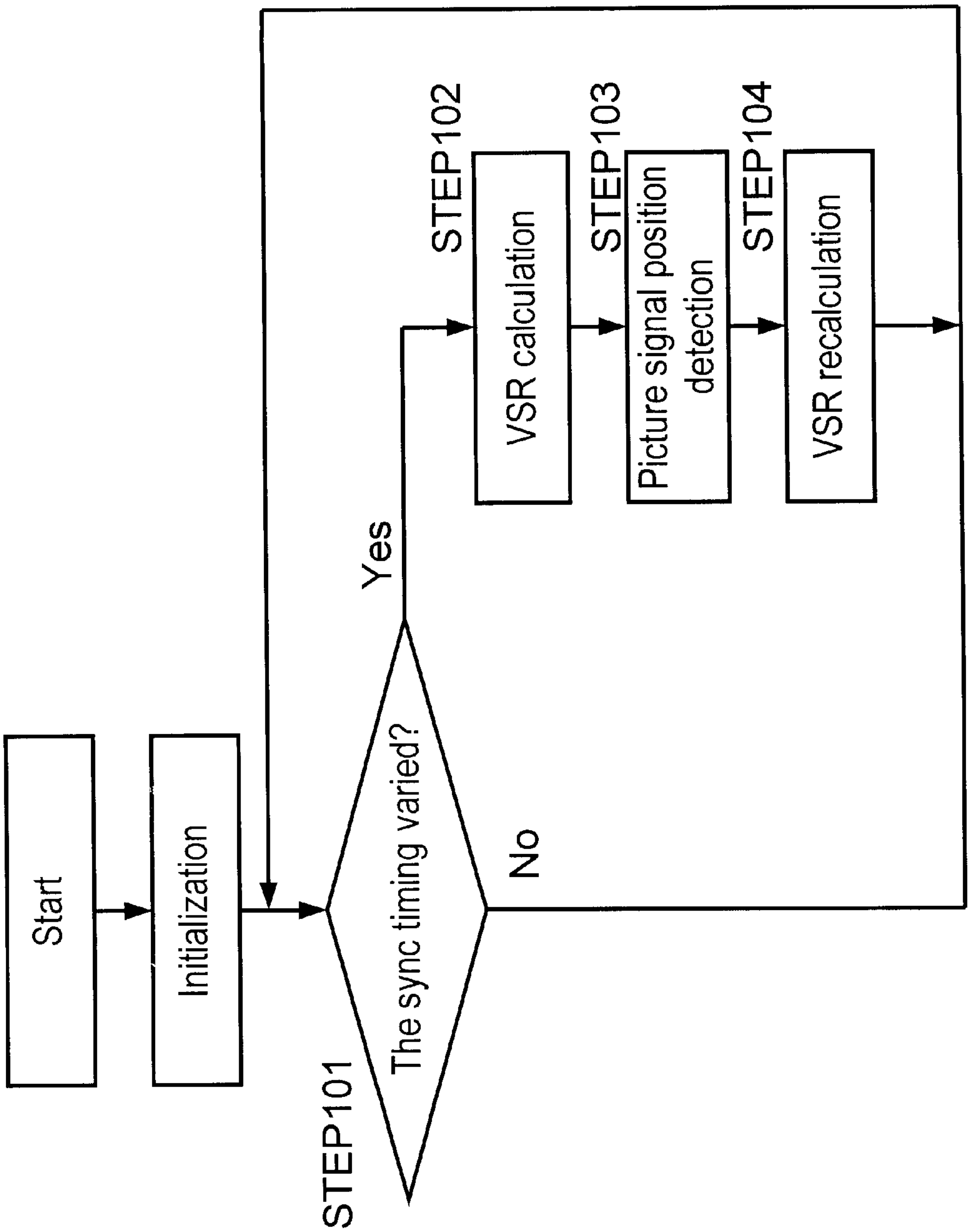
FIG. 2 shows a flow chart explaining a function of an automatic picture display position adjusting circuit in accordance with the first exemplary embodiment of the present invention.

FIG. 1 shows a block diagram of an automatic picture display position adjusting circuit in accordance with a first exemplary embodiment of the present invention. FIG. 2 shows a flowchart explaining a function of the automatic picture display position adjusting circuit.

In FIG. 1, an input analog video signal is amplified at a video signal amplifier 1 and then converted into a digital video signal at an A/D converter (Analog-to-Digital converter) 2. Horizontal and vertical sync signals are separated from the input video signal at a sync separator 3 and are supplied to a first PLL.(Phase Locked Loop) circuit 4. The first PLL circuit 4 generates sampling clock signals synchronized with the sync signals which are necessary for converting an analog signal into a digital signal at the A/D converter 2. A digital video signal output from A/D converter 2 is converted into a digital signal having the same number of pixels as that of the display device 8 at a number of pixels converter 5 using the same sampling clock signals output from the first PLL circuit 4. The output signal converted into a digital picture signal having the same number of pixels as that of the display device 8 is displayed on the display device 8 as a picture. A microcomputer 6, a calculating/controlling means employing a sync timing detector, counts the number of pulses of both horizontal and vertical sync signals output from sync separator 3 during a predetermined period, or counts the number of timer interrupt generated at a predetermined interval between two successive sync pulses. The microcomputer 6 controls the number of pixels converter 5 based on the counted value. A reference clock signal is generated at a second PLL circuit 7 and the reference clock signal is used for driving a pixel display device 8 through the number of pixels converter 5.

A function of the microcomputer 6 is explained in detail hereinbelow, referring to a flow chart shown in FIG. 2.

(Step 101)

Sync frequency is usually different from personal computer to personal computer. As a display monitor is used in connection with a personal computer, it is desirable for a display monitor to correctly operate with any personal computer. Correct operation of a display monitor implies that the position and size of the displayed picture are appropriate for the display monitor's screen regardless of the sync frequency and sync polarity of the personal computer. Furthermore, a personal computer may have several formats for displaying a picture. One example is:

| mode no. | no. of pixels | fH(kHz) | fV(Hz) |
|---|---|---|---|
| 1 | 640 × 480 | 31.5 | 60 |
| 2 | 640 × 480 | 37.5 | 75 |
| 3 | 800 × 600 | 37.9 | 60 |
| 4 | 800 × 600 | 46.9 | 75 |
| 5 | 1024 × 768 | 48.4 | 60 |
| 6 | 1024 × 768 | 60.0 | 75 |
| 7 | 1280 × 1024 | 64.0 | 60 |
| 8 | 1280 × 1024 | 80.0 | 75 |

In the above example, one personal computer has eight modes of display.

A personal computer may be changed from one mode to another mode. Thus, a display apparatus receiving and displaying a video signal having a horizontal sync frequency fH1 may then receive and be required to display another video signal having horizontal sync frequency fH2. The function of the timing determine whether the sync timing has been varied. Furthermore, when the horizontal sync frequency does not vary but the polarity of the sync signal varies from a positive polarity to a negative polarity, the timing detector again functions to determine whether the sync timing has been varied. When the vertical sync frequency varies from fV1 to fV2, the timing detector similarly detects a variation of sync timing. In any case, when at least either one of frequencies and polarities of horizontal and vertical sync signals varies, the timing detector detects a variation of sync timing.

The sync timing detector (not shown in the drawing) in the microcomputer 6 thus detects whether there has been a variation in the sync timing of the horizontal and vertical sync signals. If a variation of sync timing is confirmed (that is, in the case of Yes), processing proceeds to Step 102. If no variation is found (that is, in the case of No), processing proceeds so that Step 101 is repeated.

The above explanation was made for a display monitor for personal computers. The same technique is applicable for a television receiver for receiving multi-broadcast systems such as NTSC (fH=15.734 kHz and fV=59.94 Hz) and PAL (fH=15.625 kHz and fV=50 Hz).

(Step 102)

According to the timing of the horizontal and vertical sync signals detected at Step 101, video signal data of the number of pixels converter 5 is calculated (VSR calculation, VSR: Variable Scan Rate, so-called Multiscan) and is set so that a picture is displayed on an effective pixel display area of pixel display device 8. At the same time, the video signal data is stored in a memory device (not shown in the drawing) within the number of pixels converter 5.

A position deviation of the picture displayed in the pixel display device 8 through the above procedures usually occurs against the effective picture display area of the pixel display device 8, and this deviation is corrected by the following procedure.

(Step 103)

Video signal data stored in the memory device inside the number of pixels converter 5 at Step 102 is read therefrom.

(Step 104)

Differences between the position data of the video signal stored in the memory device and the set value data for read-out position for supplying the pixel display device 8 with the video signal data set in the microcomputer 6 is checked; the video signal data is recalculated (VSR recalculation) so that position and size data of the input video signal displayed on the pixel display device 8 coincide with the position and size of the effective picture display area of the pixel display device 8; and the recalculated video signal is output to the number of pixels converter 5. The technique and the calculation for conversion of the number of pixels, scan conversion and VSR calculation are described in Japanese Patent Laid Open H9-247574, H9-247588 and H10-198302.

Step 101 to Step 104 are repeated until the power supply to the microcomputer 6 is turned off.

With the above procedures, the variation of the horizontal and/or vertical sync signals can always be checked, further, even when the timing of the horizontal and/or vertical sync signals vary, a picture can be automatically displayed on the pixel display device 8, in a manner that it perfectly fits with the effective picture display area thereof In this exemplary embodiment of the present invention, a sync timing detector is used for detecting variations of the sync signals. However, the invention is not restricted to the above configuration. For example, a configuration using period and phase for detecting a variation of the sync could be naturally considered.

Further, regarding the detection of sync timing it is not only carried out in a part of microcomputer 6 but can be conducted in an independent sync timing detecting means employed separately from the microcomputer 6. Meanwhile, the first PLL circuit 4 can be incorporated in the number of pixels converter 5.

Second Exemplary Embodiment

An automatic picture display position adjusting circuit in accordance with a second exemplary embodiment of the present invention is explained below, referring to FIGS. 3 and 4.

The blocks having similar functions to those in FIG. 1 are numbered with the same reference numbers as that of blocks in FIG. 1, and their explanations are omitted. The difference of the second exemplary embodiment from the first exemplary embodiment is that whether the picture is displayed on the effective display area of pixel display device 8 automatically or not can be selected by a user.

Figure 3:
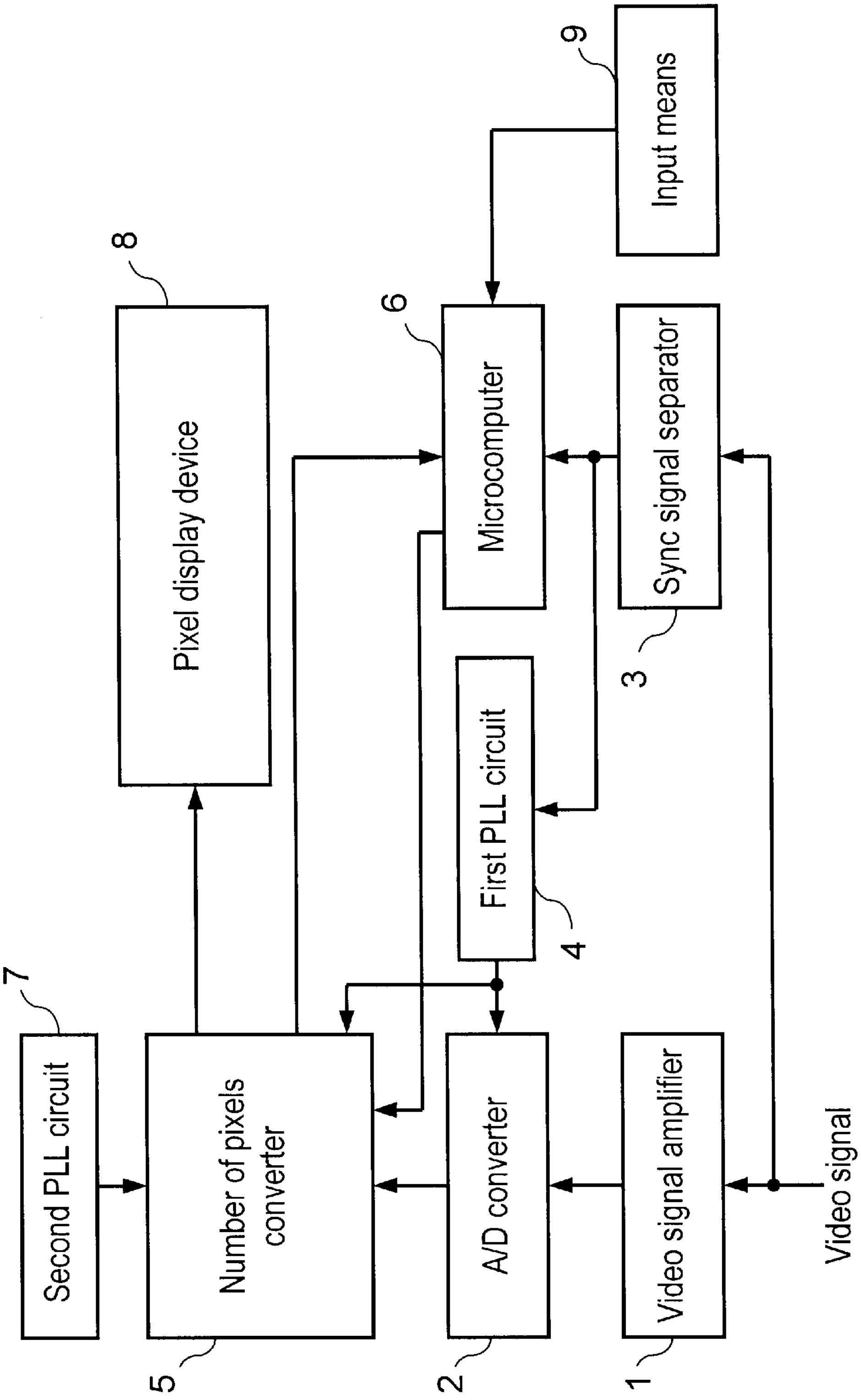
FIG. 3 shows a block diagram of an automatic picture display position adjusting circuit in accordance with a second exemplary embodiment of the present invention.
Figure 4:
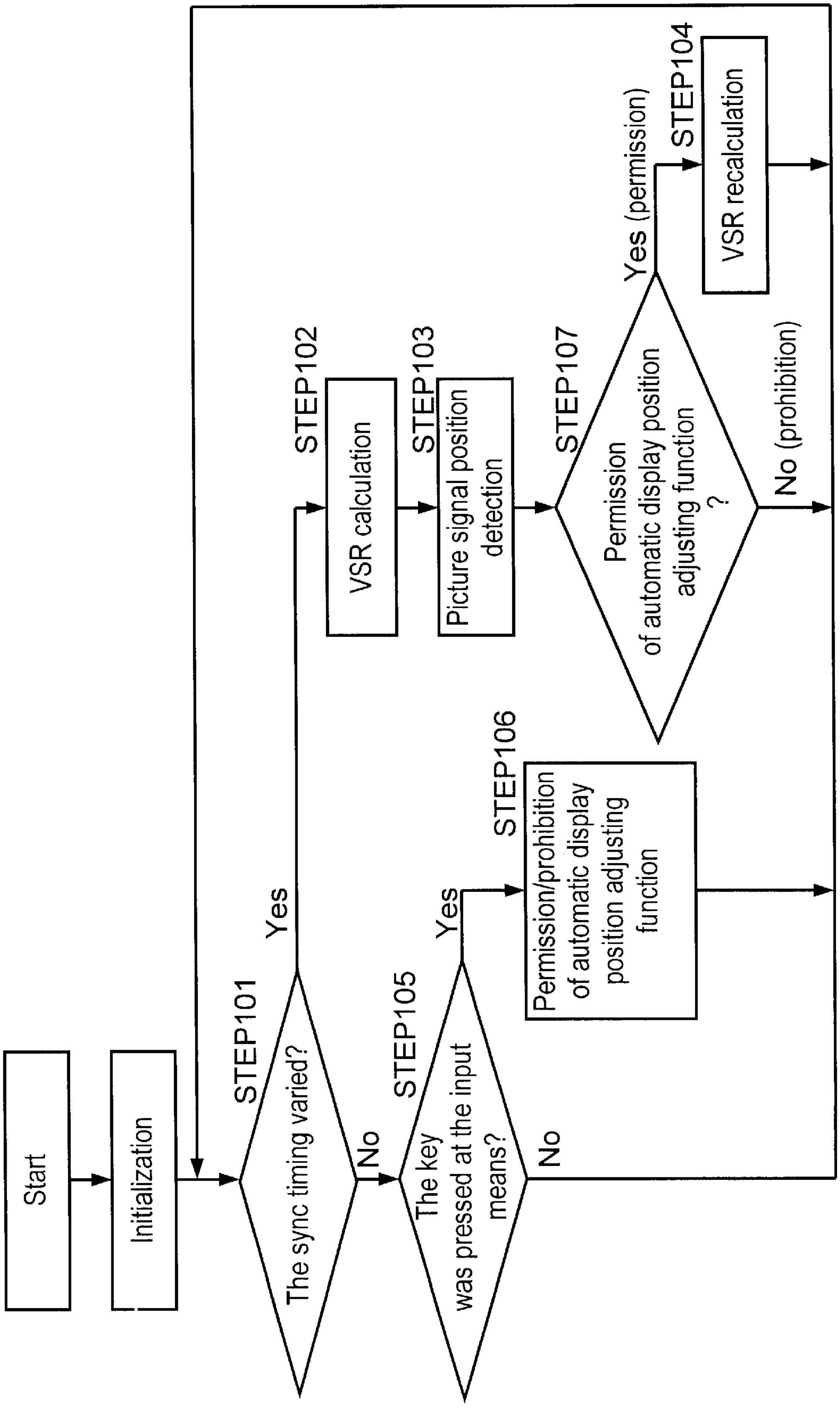
FIG. 4 is a flow chart explaining a function of an automatic picture display position adjusting circuit in accordance with the second exemplary embodiment of the present invention.

FIG. 3 is a block diagram of an automatic picture display position adjusting circuit in accordance with the second exemplary embodiment of the present invention. FIG. 4 is a flowchart explaining a function of the automatic picture display position adjusting circuit in accordance with the second exemplary embodiment of the present invention.

In FIG. 3, a block 9 shows an input means for sending a user's request by switching ON and OFF. In addition to the control function described in the first exemplary embodiment, the microcomputer 6 has a switching means (not shown in the drawing) for switching between permission and prohibition for an automatic picture display position adjustment according to ON and OFF of the input means 9. The sync timing detection may malfunction, for example, when the video signal is totally black, and in such a case, the automatic function may need to be disabled. Thus it is desirable to have the above-mentioned means to disable the automatic function.

The function of microcomputer 6 is explained below in detail, referring to a flow chart shown in FIG. 4. Steps 101 through 104 are the same as those explained in the first exemplary embodiment and their explanations are omitted here.

(Step 105)

If the sync timing variation is not found at Step 101, the input means 9 is checked at Step 105 to confirm whether or not it was operated. If the operation is confirmed (in the case of Yes), the procedure advances to Step 106. If the operation is not confirmed (the case of No), the procedure Step 101 is repeated.

(Step 106)

If the input operation of the input switch 9 is confirmed (in the case of Yes) at Step 105, the state of the automatic picture display position adjusting function is checked to judge whether it is permission or prohibition, the above selected state (permission or prohibition) is stored again in a memory device (not shown in the drawing) of microcomputer 6, and the procedure returns to Step 101.

(Step 107)

After the data of picture display position is read at Step 101, if the automatic adjusting of the picture display position is permitted (in the case of Yes), the procedure advances to Step 104, the VSR calculation is made again and the recalculated video signal data is output to the number of pixels converter 5, and the procedure returns to Step 101. If the automatic adjusting function of the picture display position is forbidden (in the case of No), the procedure returns to Step 101.

The above Step 101 to Step 107 are repeated until the power supply to microcomputer 6 is turned off.

Thus, according to the present invention, a variety of signals supplied to a picture display apparatus can be automatically discriminated and a picture can be displayed automatically to fully fit the effective picture display area of a pixel display device.

Further, a user can select whether or not the automatic picture display position adjusting function is applied .

The switching means which switches the state of the automatic picture display position adjustment between permission and prohibition and the memory means, do not have to be incorporated in the microcomputer 6, but both could be separately employed as independent means from microcomputer 6.

The present invention can be applied to a display device provided with a matrix structure of discrete pixels, and is not restricted to a liquid crystal display device.

The invention may be embodied in other specific form without deviating from the spirit or essential characteristics thereof. The present embodiment should therefore be considered, in all respects, as illustrative and not restrictive. The scope of the invention is indicated by the appended claims rather than by the foregoing description, and all changes which come within the meaning and range of equivalency of the claims are therefore intended to be embraced therein.

What is claimed is:

1. An automatic picture display position adjusting circuit comprising:

pixel quantity converting means for converting the number of pixels included in a video signal to a modified video signal;

sync signal separating means for separating horizontal and vertical signals from said video signal;

sync detecting means for detecting a variation in sync timing in at least one of said horizontal signals and said vertical signals separated by said sync signal separating means: and calculation/control means, responsive to variation detected by said sync detecting means, for a) calculating a conversion factor and transmitting said conversion factor towards said pixel quantity converting means, b) signaling for said video signal to be modified so that a picture corresponding to said modified video signal appears at a desired display position, c) detecting a displaying position of said modified video signal, d) performing a recalculation in order to shift said displaying position to said desired display position, and e) outputtinig said modified video signal at said desired display position based on said recalculation.

2. An automatic picture display position adjusting circuit comprising:

pixel quantity converting means for converting the number of pixels included in a video signal to a modified video signal;

sync signal separating means for separating horizontal and vertical signals from said video signal;

sync detecting means for detecting a variation in sync timing in at least one of said horizontal signals and said vertical signals separated by said sync signal separating means; and calculation/control means, responsive to variation detected by said sync detecting means, for a) calculating a conversion factor and transmitting said conversion factor towards said pixel quantity converting means, b) signaling for said video signal to be modified so that a picture corresponding to said modified video signal appears at a desired display position, and c) performing a recalculation based on said conversion factor.

3. An automatic picture display position adjusting circuit according to claim 1, wherein said calculation/control means performs said recalculation based on said conversion factor.

4. An automatic picture display position adjusting circuit comprising:

a pixel display device for displaying a picture;

pixel quantity converting means for converting the number of pixels included in a video signal to a modified video signal;

sync signal separating means for separating horizontal and vertical signals from said video signal;

frequency detecting means for detecting horizontal sync frequencies and vertical sync frequencies in said horizontal signals and vertical signals, respectively; and a micro computer for a) calculating and setting a setting value corresponding to said number of pixels converted to in said pixel quantity converting means according to the detected horizontal and vertical sync frequencies, b) signaling for said video signal to be modified so that a picture corresponding to said modified video signal appears at a desired display position, c) detecting a display position of said modified video signal, d) performing a recalculating in order to shift said displaying position to said desired position, and e) outputting said modified video signal at said desired display position based on said recalculation.

5. An automatic picture display position adjusting circuit according to claim 4, wherein said microcomputer:

calculates said setting value when the frequency detecting means detects a change in frequency.

6. An automatic picture display position adjusting circuit according to claim 4 comprising:

inputting means for selecting between permission and prohibition for recalculation of the setting value of said pixel quantity converting means.

7. A display device comprising:

a pixel display device;

pixel quantity converting means for converting the number of pixels included in a video signal to a modified video signal;

sync signal separating means for separating horizontal and vertical signals from said video signal;

sync detecting means for detecting a variation in sync timing in at least one of horizontal signals and vertical signals output from said sync signal separating means; and calculation/control means, responsive to variation detected by said sync detecting means, for a) calculating a conversion factor and transmitting said conversion factor towards said pixel quantity converting means, b) signaling for said video signal to be modified so that a picture corresponding to said modified video signal appears at a desired display position, and c) detecting a displaying position of said modified video signal performing a recalculation in order to shift said displaying position to said desired display position and d) outputting said modified video signal at said desired display position based on said recalculation.

* * * * *